(12) United States Patent
Kim et al.

(10) Patent No.: US 12,100,860 B2
(45) Date of Patent: Sep. 24, 2024

(54) SEPARATOR FOR ELECTROCHEMICAL DEVICE AND AN ELECTROCHEMICAL DEVICE COMPRISING THE SAME

(71) Applicant: LG CHEM, LTD., Seoul (KR)

(72) Inventors: Myeong-Soo Kim, Daejeon (KR); Hye-Jin Kwon, Daejeon (KR); Su-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 723 days.

(21) Appl. No.: 17/283,330

(22) PCT Filed: Apr. 29, 2020

(86) PCT No.: PCT/KR2020/005813
§ 371 (c)(1),
(2) Date: Apr. 7, 2021

(87) PCT Pub. No.: WO2020/226370
PCT Pub. Date: Nov. 12, 2020

(65) Prior Publication Data
US 2022/0006156 A1    Jan. 6, 2022

(30) Foreign Application Priority Data

May 9, 2019 (KR) ........................ 10-2019-0054535
Apr. 28, 2020 (KR) ........................ 10-2020-0051771

(51) Int. Cl.
*H01M 50/423* (2021.01)
*H01M 10/0525* (2010.01)
(Continued)

(52) U.S. Cl.
CPC ..... *H01M 50/423* (2021.01); *H01M 10/0525* (2013.01); *H01M 10/0569* (2013.01); *H01M 50/403* (2021.01); *H01M 50/491* (2021.01)

(58) Field of Classification Search
None
See application file for complete search history.

(56) References Cited

U.S. PATENT DOCUMENTS

2014/0045031 A1   2/2014  Matsumoto et al.
2014/0329155 A1*  11/2014  Sawamoto .......... H01M 50/423
                                          429/254
(Continued)

FOREIGN PATENT DOCUMENTS

CN       103155216 A       6/2013
CN       104185551 A      12/2014
(Continued)

OTHER PUBLICATIONS

Chinese Office Action and Search Report for Chinese Application No. 202080004736.X, dated Mar. 12, 2023, with an English translation of the Chinese Office Action.
(Continued)

*Primary Examiner* — Tracy M Dove
(74) *Attorney, Agent, or Firm* — Birch, Stewart, Kolasch & Birch, LLP

(57) ABSTRACT

A separator for an electrochemical device and an electrochemical device comprising the same. The separator comprises a porous polymer substrate and a heat resistant coating layer on at least one surface of the porous polymer substrate. The heat resistant coating layer is a porous polymer layer having pores, and comprises a polyvinyl pyrrolidone-based polymer and a polyvinylidene fluoride (PVDF)-based polymer.

11 Claims, 1 Drawing Sheet

(51) Int. Cl.
  *H01M 10/0569* (2010.01)
  *H01M 50/403* (2021.01)
  *H01M 50/426* (2021.01)
  *H01M 50/449* (2021.01)
  *H01M 50/491* (2021.01)

(56) References Cited

U.S. PATENT DOCUMENTS

| | | | |
|---|---|---|---|
| 2015/0044574 A1 | 2/2015 | Cakmak et al. | |
| 2015/0056490 A1 | 2/2015 | Shimizu et al. | |
| 2016/0190537 A1 | 6/2016 | Park et al. | |
| 2016/0204407 A1 | 7/2016 | Kai et al. | |
| 2016/0204409 A1 | 7/2016 | Jeon | |
| 2016/0285063 A1 | 9/2016 | Yang et al. | |
| 2016/0301055 A1 | 10/2016 | Lee et al. | |
| 2017/0346057 A1* | 11/2017 | Kai | H01M 50/429 |
| 2018/0123106 A1 | 5/2018 | Shin et al. | |
| 2019/0131604 A1 | 5/2019 | Yoon et al. | |
| 2019/0207190 A1 | 7/2019 | Hu et al. | |
| 2019/0348655 A1 | 11/2019 | Kim et al. | |
| 2020/0335759 A1 | 10/2020 | Lane et al. | |

FOREIGN PATENT DOCUMENTS

| | | |
|---|---|---|
| CN | 105133087 A | 12/2015 |
| CN | 105518905 A | 4/2016 |
| CN | 105536352 A | 5/2016 |
| CN | 107185838 A | 9/2017 |
| CN | 107799703 A | 3/2018 |
| CN | 108280363 A | 7/2018 |
| CN | 108463904 A | 8/2018 |
| CN | 109037557 A | 12/2018 |
| EP | 3 832 756 A1 | 6/2021 |
| EP | 3 832 758 A1 | 6/2021 |
| JP | 11-152366 A | 6/1999 |
| KR | 10-2014-0016715 A | 2/2014 |
| KR | 10-2014-0026009 A | 3/2014 |
| KR | 10-2014-0134297 A | 11/2014 |
| KR | 10-1551757 B1 | 9/2015 |
| KR | 10-2016-0129578 A | 11/2016 |
| KR | 10-2017-0016904 A | 2/2017 |
| KR | 10-2017-0097210 A | 8/2017 |
| KR | 10-2017-0123186 A | 11/2017 |
| KR | 10-2018-0016408 A | 2/2018 |
| KR | 10-2018-0031613 A | 3/2018 |
| KR | 10-2019-0006586 A | 1/2019 |
| KR | 10-2019-0022917 | 3/2019 |
| KR | 10-2019-0044530 | 4/2019 |
| WO | WO 2013/080946 A1 | 6/2013 |
| WO | WO 2015/076571 A1 | 5/2015 |
| WO | WO 2018/003373 A1 | 1/2018 |

OTHER PUBLICATIONS

International Search Report (PCT/ISA/210) issued in PCT/KR2020/005813, dated Aug. 21, 2020.
European Patent Office Search Report dated Feb. 22, 2022 for EP Application No. 20802576.7.

* cited by examiner

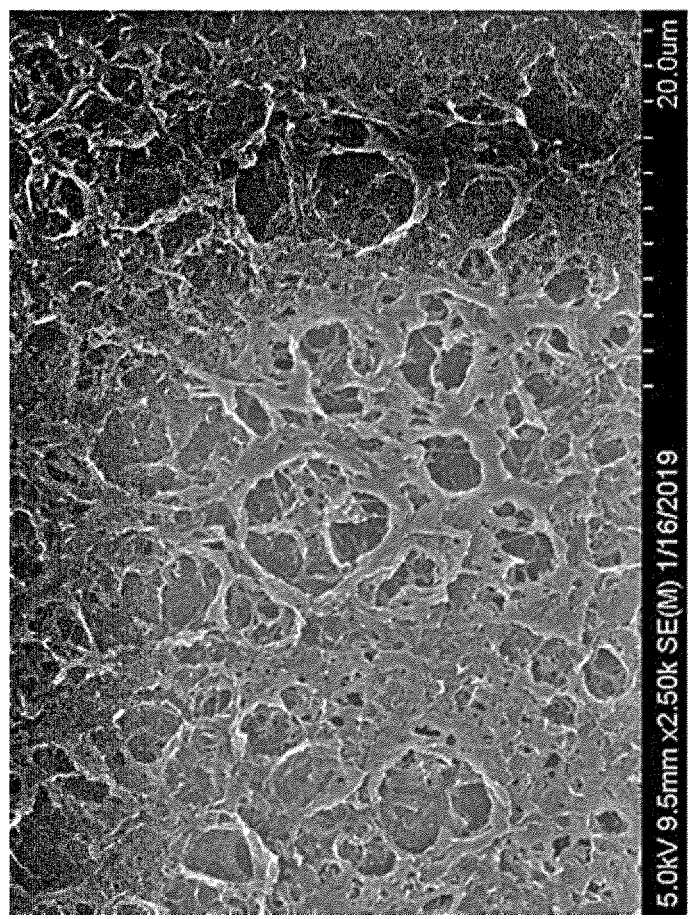

SEPARATOR FOR ELECTROCHEMICAL DEVICE AND AN ELECTROCHEMICAL DEVICE COMPRISING THE SAME

TECHNICAL FIELD

The present application claims priority to Korean Patent Application No. 10-2019-0054535 filed on May 9, 2019 and Korean Patent Application No. 10-2020-0051771 filed on Apr. 28, 2020 in the Republic of Korea. The present disclosure relates to a separator for an electrochemical device and an electrochemical device comprising the same.

BACKGROUND ART

Recently, electrochemical devices have received increasing attention with reference to ensuring their safety. Particularly, a secondary battery, such as a lithium secondary battery, has an electrode assembly comprising a positive electrode, a negative electrode and a separator. Such an electrode assembly may be manufactured to have a structure in which the separator is interposed between the positive electrode and the negative electrode.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, comprising orientation, thereby causing a short-circuit between a positive electrode and a negative electrode.

To solve the above-mentioned safety problem of an electrochemical device, there has been suggested a separator comprising a porous coating layer formed by coating a mixture of an excessive amount of inorganic particles with a binder resin on at least one surface of a porous substrate having a plurality of pores. Since the inorganic particles contained in the porous coating layer have high heat resistance, it is possible to maintain electrical insulation between a positive electrode and a negative electrode, even when an electrochemical device is overheated, thereby preventing a short-circuit.

A process for forming such a porous coating layer comprises several steps, such as mixing a polymer resin with a solvent to prepare a polymer solution; introducing inorganic particles to the polymer solution and dispersing the inorganic particles homogeneously in slurry; milling the slurry to control the inorganic particles to a predetermined size; or the like. In the process, it takes a long time to disperse and mill the inorganic particles, which causes a delay in the process.

Under these circumstances, there is a need for developing a separator which shows high processing efficiency and has similar quality to the quality of a separator comprising inorganic particles.

DISCLOSURE

Technical Problem

The present disclosure is directed to providing a separator which shows high processing efficiency. The present disclosure is also directed to providing a separator which has a small thickness and high heat resistance/stability. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure is designed to solve the problems of the related art. According to an embodiment of the present disclosure, there is provided a separator for an electrochemical device, comprising: a porous polymer substrate; and a heat resistant coating layer on at least one surface of the porous polymer substrate, wherein the heat resistant coating layer comprises a resin composition comprising a polyvinylidene fluoride (PVDF)-based polymer and a polyvinyl pyrrolidone (PVP)-based polymer, the content of the PVP-based polymer is 5 wt % to 40 wt % based on 100 wt % of the resin composition, the PVP-based polymer has a molecular weight (Mw) of 900,000 g/mol or more, the resin composition is present on the surface of the porous polymer substrate at a loading amount of 1 g/cm$^2$ or more, and the separator has an air permeability of 900 s/100 cc or less.

According to the second embodiment of the present disclosure, there is provided the separator for an electrochemical device as defined in the first embodiment, wherein the heat resistant coating layer has a thickness of 0.5 μm to 5.0 μm.

According to the third embodiment of the present disclosure, there is provided the separator for an electrochemical device as defined in the first or the second embodiment, wherein the heat resistant coating layer comprises a resin composition comprising a PVDF-based polymer and a polyvinyl pyrrolidone-based polymer, and the resin composition is present in an amount of 90 wt % or more, preferably 99 wt % or more, in the heat resistant coating layer.

According to the fourth embodiment of the present disclosure, there is provided the separator for an electrochemical device as defined in any one of the first to the third embodiments, wherein the PVDF-based polymer comprises at least one of vinylidene fluoride homopolymer poly) vinylidne fluoride-co-hexafluoropropylene (PVDF-HFP) or poly (vinylidene fluoride-co-chlorotrifluoroethylene) (PVDF-CTFE).

According to the fifth embodiment of the present disclosure, there is provided the separator for an electrochemical device as defined in any one of the first to the fourth embodiments, wherein the PVP-based polymer comprises at least one of N-vinyl pyrrolidone homopolymer or a copolymer of N-vinyl pyrrolidone and a comonomer capable of free radical copolymerization, and the copolymer has a content of N-vinyl pyrrolidone of 60 wt % or more.

According to the sixth embodiment of the present disclosure, there is provided the separator for an electrochemical device as defined in the fifth embodiment, wherein the comonomer comprises at least one of acrylamide, acrylamide derivative, acrylate, or acrylate derivative.

According to the seventh embodiment of the present disclosure, there is provided the separator for an electrochemical device as defined in any one of the first to the six embodiments, wherein the PVP-based polymer has a glass transition temperature (Tg) of 150° C. or higher.

According to the eighth embodiment of the present disclosure, there is provided the separator for an electrochemical device as defined in any one of the first to the seventh embodiments, wherein the PVP-based polymer has a melting point (Tm) of 380° C. or higher.

According to the ninth embodiment of the present disclosure, there is provided the separator for an electrochemical device as defined in any one of the first to the eighth embodiments, wherein the PVP-based polymer has a packing density of 0.1 g/m$^3$ to 0.6 g/m$^3$.

According to the tenth embodiment of the present disclosure, there is provided the separator for an electrochemical device as defined in the ninth embodiment, wherein the PVP-based polymer has a packing density of 0.2 g/m$^3$ to 0.5 g/m$^3$.

According to the eleventh embodiment of the present disclosure, there is provided a method for manufacturing the above-described separator, comprising the steps of: preparing a polymer solution containing a resin composition comprising a PVDF-based polymer and a PVP-based polymer, and a dispersion medium; applying the polymer solution to the surface of a porous polymer substrate, drying the coated porous polymer substrate under a humidified condition, wherein the dispersion medium comprises a solvent and a non-solvent, and the polymer solution comprises the resin composition at a concentration less than 20 wt %.

According to the twelfth embodiment of the present disclosure, there is provided the method as defined in the eleventh embodiment, wherein the dispersion medium comprises the non-solvent at a concentration of 20 mol % or less, based on 100 mol % of the dispersion medium.

Advantageous Effects

The separator according to an embodiment of the present disclosure is provided with a heat resistant coating layer comprising polyvinyl pyrrolidone, and thus has excellent heat resistance/stability as well as a small thickness. In addition, the method for manufacturing a separator according to the present disclosure comprises no step of dispersing or milling inorganic particles, and thus reduces the time required for manufacturing a separator, thereby providing improved processing efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

The Figure illustrates a scanning electron microscopic (SEM) image of the surface of the separator obtained according to Example 1.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part[comprises] an element' does not preclude the presence of any additional elements but means that the part may further comprise the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure comprising an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms comprise the above-listed words, derivatives thereof and words having similar meanings.

The present disclosure relates to a separator for an electrochemical device and an electrochemical device comprising the same.

According to an embodiment of the present disclosure, the electrochemical device means a device converting chemical energy into electrical energy by electrochemical reactions, and has a concept covering a primary battery and a secondary battery. In addition, the secondary battery is a rechargeable battery, and has a concept covering a lithium ion battery, nickel-cadmium battery, nickel-metal hydride battery, or the like. According to an embodiment of the present disclosure, the separator for an electrochemical devices functions as an insulation film which electrically insulates electrodes having opposite polarities to each other in an electrochemical device. For example, the separator is a structural element of a unit cell comprising a positive electrode, a negative electrode and a separator.

Hereinafter, the constitution of the separator according to the present disclosure will be explained in more detail.

According to an embodiment of the present disclosure, the separator comprises a porous polymer substrate and a heat resistant coating layer disposed on at least one surface of the porous polymer substrate, wherein the heat resistant coating layer is a porous polymer membrane having pores formed therein, and comprises a polyvinyl pyrrolidone-based polymer and a PVDF-based polymer.

The porous substrate means a porous ion-conducting barrier which allows ions to pass therethrough, while interrupting an electrical contact between a negative electrode and a positive electrode, and has a plurality of pores formed therein. The pores are interconnected so that gases or liquids may pass from one surface of the substrate to the other surface of the substrate. Materials forming the porous substrate may be any organic materials or inorganic materials having electrical insulation property. Particularly, with a view to imparting a shut-down function to the substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may comprise at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene. The porous substrate may comprise a non-woven web, a porous polymer film, or a laminate of two or more layers thereof, but is not limited thereto.

Particularly, the porous polymer substrate may be any one of the following a) to e):

a) A porous film formed by melting and extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and e) A porous composite film having a multilayer structure comprising two or more of a) to d).

According to the present disclosure, the porous polymer substrate preferably has a thickness of 3-12 μm or 5-12 μm. When the thickness is smaller than the above-defined range, it is not possible to obtain a sufficient conducting barrier function. On the other hand, when the thickness is excessively larger than the above-defined range (i.e. the porous polymer substrate is excessively thick), the separator may show excessively increased resistance.

According to an embodiment of the present disclosure, polyolefin preferably has a weight average molecular weight of 100,000-5,000,000. When the weight average molecular weight is smaller than 100,000, it is difficult to ensure sufficient dynamic physical properties. In addition, when the weight average molecular weight is larger than 5,000,000, shut-down characteristics may be degraded or molding may become difficult. In addition, the porous polymer substrate may have a puncture strength of 300 gf or more in terms of improvement of production yield.

According to the present disclosure, the term 'molecular weight' refers to weight average molecular weight (Mw). According to an embodiment of the present disclosure, the molecular weight (Mw) may be determined by using gel permeation chromatography (GPC). For example, 200 mg of a compound whose molecular weight is to be determined is diluted in 200 mL of a solvent, such as tetrahydrofuran (THF), to prepare about 1000 ppm of sample, and then the molecular weight may be determined by using Agilent 1200 series GPC instrument at a flow rate of 1 mL/min through a refractive index (RI) detector.

The puncture strength of a porous polymer substrate refers to the highest puncture load (gf) measured by carrying out a puncture test with Kato tech KES-G5 handy compression tester under the conditions of a needle tip radius of curvature of 0.5 mm and a puncture rate of 2 mm/sec.

According to an embodiment of the present disclosure, the porous polymer substrate may be any porous polymer substrate as long as it is a planar porous polymer substrate used for an electrochemical device. For example, an insulating thin film showing high ion permeability and mechanical strength and generally having a pore diameter of 10-100 nm and a thickness of 5-12 μm may be used.

According to the present disclosure, the heat resistant coating layer may be formed on at least one surface of the porous polymer substrate, and comprises a polyvinyl pyrrolidone-based polymer and a PVDF-based polymer.

The heat resistant coating layer is a porous layer having a plurality of micropores. In the heat resistant coating layer, the micropores are interconnected with one or more pores adjacent thereto, and have a porous structure so that gases or liquids may pass from one surface to the other surface.

According to an embodiment of the present disclosure, the micropores of the heat resistant coating layer may be derived from the humidified phase separation of a binder resin carried out during the formation of the heat resistant coating layer. According to an embodiment of the present disclosure, pores having various sizes ranging from several nanometers to several tens of nanometers in diameter may be formed in the heat resistant coating layer. The pore size may be calculated from image analysis through scanning electron microscopic (SEM) images. When the pore size is excessively small, the pores may be blocked with ease due to the swelling of the binder resin in the heat resistant coating layer. When the pore size is excessively large, the resultant separator hardly functions as an insulating film and a secondary battery using the separator shows a problem of degradation of self-discharge characteristics. Thus, it is preferred to control the pore size to an adequate level, considering these. The pore size may be controlled to an adequate range by suitably selecting and controlling the materials for the heat resistant coating layer, temperature, humidity, solvent, non-solvent ingredient, or the like, in the humidified phase separation process as described hereinafter According to an embodiment of the present disclosure, the heat resistant coating layer preferably has a porosity of 30-80%. A porosity of 30% or more is advantageous to lithium ion permeability, while a porosity of 80% or less is suitable for ensuring adhesion between a separator and an electrode, since the surface opening ratio is not excessively high in this case. In addition, according to an embodiment of the present disclosure, the separator has an air permeability of 900 s/100 cc or less, preferably 500 s/100 cc or less.

Meanwhile, according to the present disclosure, porosity and pore size may be determined by using BELSORP (BET system) available from BEL JAPAN Co. with an adsorption gas, such as nitrogen, or by using mercury intrusion porosimetry, capillary flow porosimetery, or the like. According to an embodiment of the present disclosure, the porosity of the heat resistant coating layer may be calculated from the thickness and weight of the resultant coating layer and the theoretical density of the coating layer.

As used herein, the term 'permeability' means the time required for 100 cc of air to permeate through a separator, is expressed in the unit of second/100 cc in the present disclosure, may be used exchangeably with 'transmission', and is generally represented by Gurley value, or the like.

According to an embodiment of the present disclosure, the heat resistant coating layer preferably has a thickness of 0.5-5.0 μm on one surface of the porous substrate. Preferably, the thickness may be 0.7 μm or more, 1 μm or more, or 1.5 μm or more, considering mechanical properties, adhesion, or the like. Within the above-defined range, it is possible to provide excellent adhesion to an electrode, and thus to increase the cell strength of a battery. Meanwhile, when the thickness is 5.0 μm or less, it is possible to provide advantageous effects in terms of cycle characteristics and resistance characteristics of a battery.

The heat resistant coating layer comprises a resin composition comprising a PVDF-based polymer and a polyvinyl pyrrolidone-based polymer, and the resin composition is present in an amount of 90 wt % or more, preferably 99 wt % or more, based on 100 wt % of the heat resistant coating layer.

PVDF-Based Polymer

According to an embodiment of the present disclosure, the PVDF-based polymer may be present in an amount of 60-95 wt % based on 100 wt % of the resin composition. As described hereinafter, the heat resistant coating layer may have pores formed by inducing phase separation of the PVDF-based polymer, while slurry for forming a heat resistant coating layer is solidified under a humidified condition. Herein, when the content of the PVDF-based polymer is excessively low in the resin composition, the ingredient capable of undergoing phase separation is insufficient so that pores may not be formed with a desired level in terms of pore size and porosity.

According to an embodiment of the present disclosure, the PVDF-based polymer may have a molecular weight (Mw) of 10,000-1,000,000, preferably 150,000-500,000.

According to an embodiment of the present disclosure, the PVDF-based polymer may comprise vinylidene fluoride homopolymer (i.e. polyvinylidene fluoride), copolymer of vinylidene fluoride with a copolymerizable monomer, or a mixture thereof. According to an embodiment, particular examples of the monomer comprise fluorinated monomers and/or chlorinated monomers. Non-limiting examples of the fluorinated monomers comprise at least one selected from: vinyl fluoride; trifluoroethylene (TrFE); chlorofluoroethylene (CTFE); 1,2-difluoroethylene; tetrafluoroethylene (TFE); hexafluoropropylene (HFP); perfluoro(alkylvinyl) ether, such as perfluoro(methylvinyl)ether (PMVE), perfluoro(ethylvinyl)ether (PEVE) or perfluoro(propylvinyl)ether (PPVE); perfluoro(1,3-dioxole); perfluoro(2,2-dimethyl-1,3-dioxol) (PDD); or the like.

According to an embodiment of the present disclosure, when the PVDF-based polymer comprises a copolymer of vinylidene fluoride with a copolymerizable monomer, the copolymer may have a substitution ratio with the monomer of 0.1-25 wt %. Preferably, the substitution ratio with the monomer may be 8-20 wt %.

According to an embodiment of the present disclosure, the PVDF-based polymer may comprise vinylidene fluoride homopolymer, PVDF-HFP, PVDF-CTFE, PVDF-TFE, PVDF-TrFE, or a mixture containing two or more of them.

According to an embodiment of the present disclosure, the PVDF-based polymer may comprise PVDF-HFP. In addition, the PVDF-based polymer may further comprise at least one of PVDF-CTFE, PVDF-FEP and PVDF-TFE, in combination with PVDF-HFP. Herein, PVDF-HFP may have a molecular weight (Mw) of 10,000 g/mol to 1,000,000 g/mol, preferably 150,000 g/mol to 500,000 g/mol. In addition, PVDF-HFP may have a substitution ratio with HFP of 0.1 wt % to 25 wt %, preferably 8 wt % to 80 wt %.

Polyvinyl Pyrrolidone-Based Polymer

According to the present disclosure, the polyvinyl pyrrolidone (PVP)-based polymer means a polymer comprising N-vinyl pyrrolidone as monomer. The polyvinyl pyrrolidone-based polymer may comprise at least one of N-vinyl pyrrolidone homopolymer and a copolymer of N-vinyl pyrrolidone with an additional comonomer capable of radical copolymerization.

Meanwhile, according to an embodiment of the present disclosure, when using the copolymer with a comonomer as the polyvinyl pyrrolidone-based polymer, it is preferred that the content of N-vinyl pyrrolidone is 60 wt % or more, 70 wt % or more, or 80 wt % or more, in terms of improvement of electrochemical characteristics, as desired according to the present disclosure.

According to an embodiment of the present disclosure, the comonomer may comprise at least one of acrylic acid and substituted acrylic acid, salts thereof, esters and amides thereof (wherein the substituent on a carbon atom is positioned at 2- or 3-position of acrylic acid and is independently selected from the group consisting of C1-C20 alkyl groups, —CN and COOH), methacrylic acid, ethacrylic acid, acrylamide, methacrylamide, N,N-dimethylacrylamide and N,N-dimethylmethacrylamide.

In addition to the above monomers, particular examples of suitable comonomers comprise acrylic acid amide and derivatives thereof, such as ethacrylamide, N-methyl acrylamide, N-ethylacrylamide, N-isopropylacrylamide, N-butylacrylamide, N-t-butylacrylamide, N-octylacrylamide, N-t-octylacrylamide, N-octadecylacrylamide, N-phenylacrylamide, N-methylmethacrylamide, N-ethylmethacrylamide, N-isopropylmethacrylamide, N-dodecylmethacrylamide, N-[3-(dimethylamino)propyl]methacrylamide, N-[3-(dimethylamino)propyl]acrylamide, N-[3-(dimethylamino)butyl]methacrylamide, N-[8-(dimethylamino)octyl]methacrylamide, N-[12-(dimethylamino) dodecyl]methacrylamide, N-[3-(diethylamino)propyl]methacrylamide, N-[3-(diethylamino)propyl]acrylamide, unsaturated sulfonic acid, such as acrylamidopropanesulfonic acid, and 3-cyanoacrylic acid.

Particular examples of esters of acrylic acid and derivatives thereof comprise methyl acrylate, ethyl acrylate, propyl acrylate, n-butyl acrylate, isobutyl acrylate, t-butyl acrylate, 2-ethylhexyl acrylate, decyl acrylate, methyl methacrylate, ethyl methacrylate, propyl methacrylate, n-butyl methacrylate, isobutyl methacrylate, t-butyl methacrylate, 2-ethylhexyl methacrylate, decyl methacrylate, stearyl (meth)acrylate, 2,3-dihydroxypropyl acrylate, 2,3-dihydroxypropyl methacrylate, 2-hydroxyethyl acrylate, hydroxypropyl acrylate, 2-hydroxyethyl methacrylate, 2-hydroxyethyl ethacrylate, 2-methoxyethyl acrylate, 2-methoxyethyl methacrylate, 2-methoxyethyl ethacrylate, 2-ethoxyethyl methacrylate, 2-ethoxyethyl ethacrylate, hydroxypropyl methacrylate, glyceryl monoacrylate, glyceryl monomethacrylate, polyalkyleneglycol (meth)acrylate, N,—N-dimethylaminomethyl (meth)acrylate, N,N-diethylaminomethyl (meth)acrylate, N,N-dimethylaminoethyl (meth)acrylate, N,N-diethylaminoethyl (meth)acrylate, N,N-dimethylaminobutyl (meth)acrylate, N,N-diethylaminobutyl (meth)acrylate, N,N-dimethylaminohexyl (meth)acrylate, N,N-dimethylaminooctyl (meth)acrylate, and N,N-dimethylaminododecyl (meth)acrylate.

Other suitable comonomers comprise vinyl and allyl esters of C1-C40 linear, C3-C40 branched or C3-C40 carbocyclic carboxylic acids, such as vinyl acetate, vinyl propionate and hydrolyzed products thereof, such as vinyl alcohol, vinyl or allyl halide, preferably vinyl chloride and allyl chloride, vinyl ether, preferably methyl, ethyl, butyl or dodecyl vinyl ether, vinyl formamide, N-vinyl-N-methyl acetamide, vinyl amine; methyl vinyl ketone; vinyl lactam, preferably vinyl pyrrolidone, vinyl caprolactam and vinyl piperidone, vinyl- or allyl-substituted heterocyclic compounds, preferably vinyl pyridine, vinyl oxazoline and allyl pyridine, and vinyl furan and allyl alcohol. Also, N-vinyl imidazole compounds represented by the following Chemical Formula 1 are suitable.

[Chemical Formula 1]

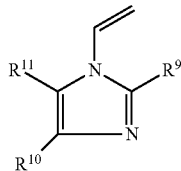

wherein each of $R^9$ to $R^{11}$ independently represents hydrogen, a C1-C4 alkyl or phenyl. Particular examples of the compounds comprise 1-vinylimdazole, 1-vinyl-2-methylvinylimidazole, 3-methyl-1-vinylimidazolium chloride and 3-methyl-1-vinylimidazolium methylsulfate.

According to another embodiment, an additional suitable comonomer may be diallylamine represented by the following Chemical Formula 2:

[Chemical Formula 2]

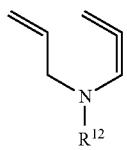

wherein $R^{12}$ represents a C1-C24 alkyl, such as diallyldimethylammonium chloride.

Other suitable comonomers comprise maleic acid, fumaric acid, maleic anhydride and half-esters and half-amides and imides thereof, maleimide, crotonic acid, itaconic acid, vinyl ether (e.g. methyl, ethyl, butyl or dodecyl vinyl ether), vinylidene chloride, and hydrocarbons having one or more carbon-carbon double bonds, preferably styrene, alpha-methylstyrene, tert-butylstyrene, styrenesulfonic acid and salts thereof, butadiene, isoprene, cyclohexadiene, ethylene, propylene, 1-butene, 2-butene, isobutylene, and vinyl toluene.

In the above-mentioned examples, preferred examples comprise acrylic acid, methacrylic acid, maleic acid, fumaric acid, crotonic acid, maleic anhydride and half-esters and half-amides and imides thereof, methyl acrylate, methyl methacrylate, ethyl acrylate, ethyl methacrylate, n-butyl acrylate, n-butyl methacrylate, t-butyl acrylate, t-butyl methacrylate, isobutyl acrylate, isobutyl methacrylate, 2-ethylhexyl acrylate, stearyl acrylate, stearyl methacrylate, N-t-butyl acrylamide, N-octyl acrylamide, N-t-octyl acrylamide, 2-hydroxyethyl acrylate, 2-hydroxypropyl acrylate, 2-2-hydroxyethyl methacrylate, 3-hydroxypropyl methacrylate, 3-hydroxypropyl acrylate, alkylene glycol (meth)acrylate, styrene, unsaturated sulfonic acid and salts thereof, such as acrylamidopropanesulfonic acid and styrenesulfonic acid, vinyl pyrrolidone, vinyl caprolactam, vinyl ethers (e.g. methyl, ethyl, butyl or dodecyl vinyl ether), vinyl foramide, N-vinyl-N-methyl acetamide, vinylamine, 1-vinyl imidazole, 1-vinyl-2-methyl imidazole, N,N-dimethylaminomethyl methacrylate and N-[3-(dimethylamino)propyl]methacrylamide; 3-methyl-1-vinylimidazolium chloride, 3-methyl-1-vinylimidazolium methyl sulfate, N,N-dimethylaminoethyl methacrylate, N-isopropyl-methacrylamide, N-[3-(dimethylamio)propyl]methacrylamide quaternarized with methyl chloride, VCAp, VI, 1-vinyl-3-methylimidazolium salts, such as chloride and methylsulfate (QV1), VAC, (meth)acrylamide, dimethylaminoethyl (meth)acrylate and dimethylaminoethyl (meth)acrylamide and quaternary analogues thereof, diallyldimethylammonium chloride, vinyl alcohol (by hydrolysis from vinyl acetate after polymerization), VFA, vinylamine (by hydrolysis of VFA after polymerization), dimethylaminopropyl (meth)acrylate, dimethylaminopropyl (meth)acrylamide, (meth)acrylic acid, vinyl piperidone, N,N-dimethyl (meth)acrylamide, tert-butyl (meth)acrylamide, N-tert-octyl (meth)acrylamide, stearyl (meth)acrylamide, methyl, ethyl, butyl, tert-butyl (meth)acrylate, 2,3-dihydroxypropyl (meth)acrylate, N-isopropyl acrylamide, vinyl propionate, 1-vinyl-2-methylimidazole, vinyl pyridine, esters of (meth)acrylic acid or ethers of allyl alcohol and ethers of polyethylene oxide or propylene oxide or poly(ethylene oxide-co-propylene oxide) having 2-200 EO, PO or EO/PO units end-capped with methoxy or hydroxy group, methyl vinyl ether, hydroxyethyl (meth)acrylate, hydroxypropyl (meth)acrylate, vinyl lactam, vinyl oxazoline, such as vinyl oxazoline, vinyl methyl oxazoline, vinyl ethyl oxazoline, acrylamidopropanesulfonic acid, and allyl alcohol.

Other suitable comonomers comprise multifunctional monomers, such as triallylamine, trivinyl ether, divinylethylene urea, 3-vinyl-N-vinylpyrrolidone, 4-vinyl-N-vinylpyrrolidone, 5-vinyl-N-vinylpyrrolidone, pentaerythritol triallyl ether, methylene bisacrylamide, butanediol diacrylate, hexanediol diacrylate, dipropylene glycol diacrylate, allyl methacrylate, divinylbenzene, ethylene glycol dimethacrylate, triethylene glycol dimethacrylate and triethylene glycol divinyl ether.

Particularly preferred comonomers comprise N-vinylcaprolactam (VCAp), N-vinylimidazole (VI), 1-vinyl-3-methylimidazoloum salt (QV1), such as salts that can be obtained by quaternarization with methyl chloride or methyl sulfate, vinyl acetate, (meth)acrylamide, dimethylaminoethyl (meth)acrylate and dimethylaminoethyl-(meth)acrylamide and quaternary analogues thereof, and diallyldimethylammonium chloride.

Meanwhile, according to an embodiment of the present disclosure, the comonomer preferably comprises at least one of acrylamide and derivatives thereof, and acrylate and derivatives thereof, considering improvement of adhesion. According to an embodiment of the present disclosure, the polyvinyl pyrrolidone-based polymer may be used in an amount of 5-50 wt %, or 5-40 wt %, based on 100 wt % of the resin composition.

According to the present disclosure, considering heat resistance/stability of the separator, the PVP-based polymer preferably has a Tg of 150° C. or higher and a Tm of 380° C. or higher.

Meanwhile, the PVP-based copolymer has a molecular weight (Mw) of 900,000 (g/mol) or more. When the above-defined range is satisfied, it is possible to realize heat resistance similar to the heat resistance of a heat resistant layer containing an inorganic material. In addition, since no inorganic particles are present, it is possible to improve processing efficiency and to provide a separator with a small thickness.

Meanwhile, according to an embodiment of the present disclosure, the heat resistant coating layer preferably has a loading amount of the resin composition of 1 g/cm$^2$ or more. The loading amount means the weight of a resin composition contained in the heat resistant coating layers per unit area of the heat resistant coating layers coated on both surfaces of the porous polymer substrate. When the loading amount is less than the above-defined range, the content of the polymeric material contained in the heat resistant coating layer is insufficient, resulting in degradation of shrinkage and adhesion of the separator undesirably.

Meanwhile, according to an embodiment of the present disclosure, the PVP-based polymer in the heat resistant coating layer has a packing density of 0.1-0.7 g/m$^3$, preferably 0.2-0.5 g/m$^3$. When the packing density satisfies the above-defined range, it is possible to improve heat resistance, while not interrupting the phase separation behavior of the PVDF-based polymer.

As used herein, the packing density of the PVP-based polymer may be calculated according to the following Mathematical Formula 1:

Packing density of PVP-based polymer (g/m$^3$)=(PVP content in heat resistant coating layer)×{(weight per unit area of separator−weight per unit area of porous polymer substrate)/(thickness of separator−thickness of porous polymer substrate)}     [Mathematical Formula 1]

Hereinafter, the method for manufacturing a separator according to the present disclosure will be explained. The separator according to the present disclosure may be obtained by preparing a polymer solution comprising the resin composition, applying the polymer solution onto a porous polymer substrate, and solidifying the polymer solution so that a heat resistant coating layer may be formed integrally on the porous polymer substrate.

Particularly, a resin composition comprising a PVDF-based polymer and a PVP-based polymer is introduced to a dispersion medium to prepare a polymer solution. The dispersion medium may comprise a solvent and a non-solvent to the resin composition.

According to an embodiment of the present disclosure, the solvent may be at least one selected suitably from acetone, methyl ethyl ketone, N-methyl pyrrolidone, polar amide solvents, such as dimethyl acetamide, diethyl formamide, diethyl formamide, or the like.

According to an embodiment of the present disclosure, the non-solvent may be at least one selected suitably from methanol, ethanol, propanol, isopropyl alcohol (IPA), butanol, sec-butanol, amyl alcohol, 2-ethyl-1-hexanol, cyclohexanol, phenol (50° C.), ethylene glycol, 1,3-butanediol, 1,4-butanediol, glycerin, diacetone alcohol, formic acid, acetic acid, propionic acid, glycol ether, diethylene glycol, triethylene glycol, hexamethylene glycol, polyethylene glycol 400, 2,2-thiodiethanol, gamma-butyrolactone, ethyl acetate, butyl amine, cyclohexamine analine, ethylene diamine, pyridine, morpholine, 2-aminoaniline, diethanolamine, triethanolamine, aminoethylethanolamine, 2-hydroxyethylmorpholine, 2-amino-2-methyl-1-propanol, or the like.

Preferably, the dispersion medium comprises the non-solvent in an amount of 30 mol % or less, preferably 25 mol % or less, more preferably 20 mol % or less, based on 100 mol % of the dispersion medium. When the content of the non-solvent exceeds the above-defined range, phase separation cannot be performed effectively, and thus pores may not be developed well and adhesion characteristics may be degraded.

Meanwhile, according to an embodiment of the present disclosure, the resin composition in the polymer solution preferably has a concentration less than 20 wt %, preferably 15 wt % or less. When the concentration exceeds the above-defined range, the resin composition is precipitated and phase separation cannot be performed effectively.

Then, the polymer solution is applied onto a porous polymer substrate and allowed to stand under a humidified condition for a predetermined time to solidify (dry) the polymer solution. According to an embodiment, the humidified condition may refer to a relative humidity of about 40-80%. In addition, according to an embodiment of the present disclosure, the polymer solution may be solidified at a temperature of about 10-70° C. Herein, phase separation of the PVDF-based polymer in the polymer solution is induced. During the phase separation, the solvent moves toward the surface portion of the heat resistant coating layer and the PVDF-based polymer also moves toward the surface portion of the heat resistant coating layer along with the movement of the solvent. In this manner, the surface portion of the heat resistant coating layer has a higher content of the PVDF-based polymer.

According to an embodiment of the present disclosure, the polymer solution may be applied by using a conventional coating process, such as Mayer bar coating, die coating, reverse roll coating, gravure coating, or the like.

Meanwhile, the present disclosure provides a secondary battery comprising the separator. The battery comprises a negative electrode, a positive electrode and a separator interposed between the negative electrode and the positive electrode, wherein the separator comprises the resin composition according to the present disclosure.

According to the present disclosure, the positive electrode comprises a positive electrode current collector and a positive electrode active material layer formed on at least one surface of the current collector and containing a positive electrode active material, a conductive material and a binder resin. The positive electrode active material may comprise any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode comprises a negative electrode current collector, and a negative electrode active material layer formed on at least one surface of the current collector and containing a negative electrode active material, a conductive material and a binder resin. The negative electrode may comprise, as a negative electrode active material, any one selected from: lithium metal oxide; carbon such as non-graphitizable carbon or graphite-based carbon; metal composite oxides, such as $Li_xFe_2O_3$ (0≤x≤1), $Li_xWO_2$ (0≤x≤1), $Sn_xMe_{1-x}Me'_yO_z$ (Me:Mn, Fe, Pb, Ge; Me':Al, B, P, Si, elements of Group 1, 2 or 3 in the Periodic Table, halogen; 0≤x≤1; 1≤y≤3; 1≤z≤8); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may comprise stainless steel, copper, aluminum, nickel, titanium, baked carbon, aluminum or stainless steel surface-treated with carbon, nickel, titanium or silver, or the like.

The binder resin used for the electrodes may be a polymer used currently for electrodes in the art. Non-limiting examples of the binder resin comprise, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery. According to the present disclosure, the electrolyte is a salt having a structure of $A^+B^-$, wherein $A^+$ comprises an alkali metal cation such as $Li^+$, $Na^+$, $K^+$ or a combination thereof, and $B^-$ comprises an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

Further, the present disclosure provides a battery module which comprises a battery comprising the electrode assembly as a unit cell, a battery pack comprising the battery module, and a device comprising the battery pack as an electric power source. Particular examples of the device comprise, but are not limited to: power tools driven by the power of an electric motor; electric cars, comprising electric vehicles (EV), hybrid electric vehicles (HEV), plug-in hybrid electric vehicles (PHEV), or the like; electric two-wheeled vehicles, comprising E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Manufacture of Separator

Resin compositions were prepared according to the compositions as shown in the following Table 1. Acetone and isopropyl alcohol (IPA) were mixed to prepare a dispersion medium, and each of the resin compositions comprising PVP and PVDF-HFP according to Examples and Comparative Examples was introduced thereto to prepare a polymer solution. Herein, PVDF-HFP had a molecular weight (Mw) of 300,000 and a substitution ratio of 15 wt %. The polymer solution was coated onto a porous polymer substrate (thickness 9 μm, porosity 32 vol %, molecular weight 500,000, polyethylene) through a dip coating process, and humidified phase separation was induced under a relative humidity of 60% at room temperature. In this manner, separators were obtained.

TABLE 1

|  | Resin composition | | Dispersion medium | | Resin | PVP |
|  | PVP (wt %) | PVDF-HFP (wt %) | IPA concentration (mol %) | Acetone concentration (mol %) | composition concentration (wt %) | molecular weight (Mw, g/mol) |
| --- | --- | --- | --- | --- | --- | --- |
| Ex. 1 | 40 | 60 | 20 | 80 | 15 | 900,000 |
| Ex. 2 | 40 | 60 | 20 | 80 | 15 | 3,000,000 |
| Comp. Ex. 1 | 40 | 60 | 20 | 80 | 15 | 50,000 |
| Comp. Ex. 2 | 40 | 60 | 20 | 80 | 15 | 500,000 |
| Ex. 3 | 40 | 60 | 20 | 80 | 15 | 900,000 |
| Comp. Ex. 3 | 40 | 60 | 20 | 80 | 15 | 900,000 |
| Comp. Ex. 4 | 40 | 60 | 20 | 80 | 15 | 900,000 |
| Ex. 4 | 20 | 80 | 20 | 80 | 15 | 900,000 |
| Comp. Ex. 5 | 60 | 40 | 20 | 80 | 15 | 900,000 |
| Ex. 5 | 40 | 60 | 10 | 90 | 15 | 900,000 |
| Comp. Ex. 6 | 40 | 60 | 25 | 75 | 15 | 900,000 |
| Comp. Ex. 7 | 40 | 60 | 30 | 70 | 15 | 900,000 |
| Ex. 6 | 40 | 60 | 20 | 80 | 10 | 900,000 |

TABLE 1-continued

|  | Resin composition | | Dispersion medium | | Resin composition | PVP molecular |
|---|---|---|---|---|---|---|
|  | PVP (wt %) | PVDF-HFP (wt %) | IPA concentration (mol %) | Acetone concentration (mol %) | concentration (wt %) | weight (Mw, g/mol) |
| Ex. 7 | 15 | 85 | 20 | 80 | 15 | 900,000 |
| Comp. Ex. 8 | 40 | 60 | 20 | 80 | 20 | 900,000 |
| Comp. Ex. 9 | 40 | 60 | 20 | 80 | 25 | 900,000 |

TABLE 2

|  | Coating layer thickness (μm) | Loading amount (g/cm²) | Packing density of PVP in heat resistant layer (g/m³) | Air permeability (s/100 cc) | Heat shrinkage (%, 150° C.) (TD/MD) | Adhesion to electrode (gf/25 mm) |
|---|---|---|---|---|---|---|
| Ex. 1 | 1 μm/1 μm | 1.0 | 0.50 | 280 | 29/25 | 57 |
| Ex. 2 | 1 μm/1 μm | 1.0 | 0.50 | 381 | 20/18 | 46 |
| Comp. Ex. 1 | 1 μm/1 μm | 1.0 | 0.50 | 93 | 67/63 | 60 |
| Comp. Ex. 2 | 1 μm/1 μm | 1.0 | 0.50 | 160 | 52/49 | 62 |
| Ex. 3 | 1 μm/1 μm | 2.0 | 0.50 | 433 | 19/15 | 84 |
| Comp. Ex. 3 | 1 μm/1 μm | 0.8 | 0.50 | 221 | 38/34 | 31 |
| Comp. Ex. 4 | 1 μm/1 μm | 0.5 | 0.50 | 130 | 57/55 | 13 |
| Ex. 4 | 1 μm/1 μm | 1.0 | 0.2 | 250 | 37/32 | 95 |
| Comp. Ex. 5 | 1 μm/1 μm | 1.0 | 0.6 | 986 | 24/21 | 51 |
| Ex. 5 | 1 μm/1 μm | 1.0 | 0.50 | 300 | 28/24 | 51 |
| Comp. Ex. 6 | 1 μm/1 μm | 1.0 | 0.50 | 1024 | 15/10 | 17 |
| Comp. Ex. 7 | 1 μm/1 μm | 1.0 | 0.50 | 3365 | 15/9 | 10 |
| Ex. 6 | 1 μm/1 μm | 1.0 | 0.50 | 279 | 29/27 | 60 |
| Ex. 7 | 1 μm/1 μm | 1.0 | 0.1 | 181 | 51/47 | 103 |
| Comp. Ex. 8 | 3 μm/3 μm | 1.0 | 0.50 | — | — | — |
| Comp. Ex. 9 | 3 μm/3 μm | 1.0 | 0.50 | — | — | — |

As can be seen from Table 2, the separators according to Examples show better results in terms of air permeability, adhesion to an electrode and heat shrinkage, as compared to Comparative Examples.

Test Methods

1) Loading Amount

The loading amount is the weight of a resin composition contained in the heat resistant coating layers per unit area of the heat resistant coating layers coated on both surfaces of the porous polymer substrate.

2) Air Permeability

The air permeability was determined as time (sec) required for 100 cc of air to permeate through a separator under a constant pressure (0.05 MPa) by using an air permeability tester (EG01-55-1MR available from Asahi Seiko). The air permeability was measured at the three points of the left side/center/right side of each sample and was recorded as the average value.

When the air permeability is 2,000 s/100 cc or more, it may cause degradation of the output and cycle characteristics of a battery.

3) Heat Shrinkage

The heat shrinkage was calculated by cutting each of the separators according to Examples and Comparative Examples into a size of 5 cm×5 cm, allowing each separator to stand at 150° C. for 30 minutes, and then calculating the shrinkage in each of the TD and MD according to the following Formula.

Heat Shrinkage(%)=[(Length before shrinking−Length after shrinking)/(Length before shrinking)]×100

4) Adhesion to Electrode

Each of the separators according to Examples and Comparative Examples was cut into a size of 100 mm (length)× 25 mm (width), and laminated with a negative electrode through hot pressing under the conditions of 60° C., 6.5 MPa and 1 second. Then, the separator was peeled at an angle of 180° at a rate of 300 mm/min by using a UTM instrument (Instron), and the peel strength was measured at this time. It is preferred that a separator has an adhesion to an electrode of 50 g/25 mm or more.

The negative electrode was obtained as follows. Negative electrode slurry was prepared by mixing 66.1 wt % of artificial graphite (coal tar pitch), 26.9 wt % of natural graphite, 1.5 wt % of SiO, 1.5 wt % of carbon black, 3 wt % of SBR as a binder and 1 wt % of CMC. The slurry was applied to copper foil at a loading amount of 495 mg/25 cm², dried in a vacuum oven at 100° C. for 10 hours or more, and then roll pressing was carried out to obtain a negative electrode (total thickness 159.6 μm).

What is claimed is:

1. A separator for an electrochemical device, comprising:
   a porous polymer substrate; and
   a heat resistant coating layer on at least one surface of the porous polymer substrate,
   wherein the heat resistant coating layer consists of a resin composition comprising a polyvinylidene fluoride (PVDF)-based polymer and a polyvinyl pyrrolidone (PVP)-based polymer,
   wherein a content of the PVP-based polymer is 5 wt % to 40 wt % based on 100 wt % of the resin composition,
   wherein a content of the PVDF-based polymer is 60 wt % to 95 wt % based on 100 wt % of the resin composition, wherein the PVP-based polymer has a molecular weight (Mw) of 900,000 g/mol or more, wherein the resin composition is present on the surface of the porous polymer substrate at a loading amount of 1 g/cm$^2$ or more, wherein the separator has an air permeability of 900s/100 cc or less, and wherein the PVDF-based polymer comprises poly(vinylidene fluoride)-co-hexafluoropropylene (PVDF-HFP) having a substitution ratio with HFP of 0.1 wt % to 25 wt %.

2. The separator for the electrochemical device according to claim 1, wherein the heat resistant coating layer has a thickness of 0.5 µm to 5.0 µm.

3. The separator for the electrochemical device according to claim 1, wherein the PVDF-based polymer further comprises at least one of a vinylidene fluoride homopolymer or poly(vinylidene fluoride-co-chlorotrifluoroethylene) (PVDF-CTFE).

4. The separator for the electrochemical device according to claim 1, wherein the PVP-based polymer comprises at least one of N-vinyl pyrrolidone homopolymer or a copolymer of N-vinyl pyrrolidone and a comonomer capable of free radical copolymerization, and wherein the copolymer has a content of N-vinyl pyrrolidone of 60 wt % or more.

5. The separator for the electrochemical device according to claim 4, wherein the comonomer comprises at least one of acrylamide, acrylamide derivative, acrylate, or acrylate derivative.

6. The separator for the electrochemical device according to claim 1, wherein the PVDF-HFP in the PVDF-based polymer has a molecular weight (Mw) of 10,000 g/mol to 1,000,000 g/mol.

7. The separator for the electrochemical device according to claim 1, wherein the PVP-based polymer has a packing density of 0.1 g/m$^3$ to 0.6 g/m$^3$.

8. The separator for the electrochemical device according to claim 7, wherein the PVP-based polymer has a packing density of 0.2 g/m$^3$ to 0.5 g/m$^3$.

9. A method for manufacturing the separator according to claim 1, comprising the steps of:

preparing a polymer solution comprising the PVDF-based polymer and the PVP-based polymer, and a dispersion medium;

applying the polymer solution to the at least one surface of the porous polymer substrate to form the heat resistant coating layer; and drying the coated porous polymer substrate under a humidified condition;

wherein the dispersion medium comprises a solvent and a non-solvent, and wherein the polymer solution comprises the PVDF-based polymer and the PVP-based polymer at a concentration less than 20 wt %.

10. The method for manufacturing the separator according to claim 9, wherein the dispersion medium comprises the non-solvent at a concentration of 20 mol % or less, based on 100 mol % of the dispersion medium.

11. The separator for the electrochemical device according to claim 1, wherein the heat resistant coating layer excludes inorganic particles.

* * * * *